Patented Jan. 3, 1950

2,493,518

UNITED STATES PATENT OFFICE 2,493,518

METHOD OF RECLAIMING VULCANIZED POLYMERS BY TREATMENT WITH METALLOID HYDRIDES

Francis P. Baldwin, Woodbridge, N. J., assignor to Standard Oil Development Company, a corporation of Delaware No Drawing. Application August 7, 1945, Serial No. 609,494

8 Claims. (Cl. 260—2.3)

This invention relates to low temperature interpolymers of isobutylene with a polyolefin; relates particularly to the recovery of used polymers; and relates especially to the reclaim of cured polymer by the application thereto of hot hydrogen sulfide.

One of the more important substitutes for rubber is the low temperature interpolymer of isobutylene with a multiolefin, prepared at temperatures ranging from about —40° C. to —164° C., that is at temperatures between about —40° F. to —262.4° F.; by the application to the mixed olefins of a dissolved Friedel-Crafts catalyst as is shown in detail in U. S. Patents Nos. 2,356,127 and 2,356,128 issued August 22, 1944. This polymer cures readily with sulfur, especially in the presence of a sulfurization aid such as tetramethyl thiuram disulfide, to yield bodies having tensile strengths ranging from 500 lbs. to 4500 lbs. per square inch, with elongations at break ranging from 250% to 1200%. Many attempts have been made to recover this polymer from worn structures such as tires and inner tubes, for reuse and various methods have been proposed which are effective for the purpose, but they are undesirably slow, or wasteful of power, or undesirable for other reasons.

According to the present invention, the polymer is returned to its original raw condition or "devulcanized" or reconditioned by a treatment with hydrogen sulfide at elevated temperatures. This process results in an excellent "devulcanization" of the polymer to yield a material which can be recompounded and recured into a good high-grade polymer article.

For the present invention, hydrogen sulfide is the preferred and outstandingly superior devulcanization material. However, it is not the only usable substance since hydrogen selenide and hydrogen telluride are also operative. However, the poisonousness and higher price of both of these compounds render them much less satisfactory. In addition, various of the gaseous, inorganic hydride reducing agents such as phosphine, arsine and stibine are similarly useful, although in this instance also the higher cost and poisonous character of the materials renders them much less satisfactory for general use. Accordingly, the devulcanizing agents of the present invention are the gaseous hydrides of elements selected from the 6th and 7th columns of the Periodic Table, said columns being commonly referred to as Group V and VI respectively.

Thus, the invention applies to a cured isobutylenediolefin polymer, a compound containing hydrogen and sulfur, at elevated temperatures to devulcanize the polymer and prepare it for recompounding and recuring. Other objects and details of the invention will be apparent from the following description.

The raw material of the present invention is a low temperature interpolymer of an isoolefin with a multiolefin, all of the lower isoolefins and polyolefins being broadly useful for the polymer. The preferred isoolefin is isobutylene but under certain circumstances such substances as 2-methyl pentene-1, 2-methyl hexene-1, 2-methyl heptene-1 or the like are similarly usable. The preferred multiolefin is isoprene or any conjugated diolefin having 4 to 6 carbon atoms per molecule such as butadiene, piperylene or dimethyl butadiene, but other multiolefins having from 4 to 10 carbon atoms such as dimethallyl or myrcene may be used likewise. Furthermore, cyclopentadiene may be used effectively instead of a multiolefin.

The reactants are mixed together in the ratio of a major proportion of the isoolefin and a minor proportion of the multiolefin or of cyclopentadiene, the preferred proportions being from 70 to 99.5 parts by weight of the isoolefin with from 30 to 0.5 parts by weight of the multiolefin.

The mixed olefins are preferably cooled to a temperature ranging from —40° C. to —165° C. This may be accomplished by the use of a refrigerating jacket upon the reactor or a storage tank for the mixed olefins, or may be accomplished by the use of an internal refrigerant. For this purpose such substances as liquid butane, liquid or solid carbon dioxide, liquid ethane, liquid ethylene or even liquid methane are suitable.

The polymerization is conducted by the application to the cold mixed olefinic material of a Friedel-Crafts catalyst selected from the list given by N. O. Calloway in his article on "The Friedel-Crafts synthesis" printed in the issue of "Chemical Reviews" published for the American Chemical Society at Baltimore in 1935 in volume XVII, No. 3, the article beginning on page 327, the list being particularly well shown on page 375. Of the catalysts listed by Calloway, aluminum chloride in solution in a low-freezing, non-complex forming solvent such as an alkyl chloride having less than 3 carbon atoms per molecule is preferred. The necessary characteristics of the solvent are that it shall dissolve the catalyst substance to the extent of at least 0.3%, thereby having solvent powers; that it shall have a freezing point below 0° C., thereby being low-freezing, although it is not necessary that the freezing point be at or below the freezing point of the polymerization reaction; and that it boil away from the Friedel-Crafts substance with a nominal rise in temperature during the boiling of not more than 1 or 2 degrees, thereby being non-complex-forming. With some of the polyolefins, gaseous boron trifluoride may be used and with some, liquid titanium tetrachloride may be used. However, all of the active metal halide Friedel-Crafts catalysts are preferably used in solution as above described.

For the catalyst solvent, any carbonaceous compound which is free from oxygen; and liquid at temperatures below 0° C. may be used, depending upon the solubility of the catalyst compound in the selected solvent. With aluminum chloride, the preferred solvents are ethyl or methyl chloride or carbon disulfide. With boron trifluoride, the preferred solvents are ethyl or methyl chloride or carbon disulfide or liquid butane, liquid propane, liquid ethylene, or the like. Aluminum bromide is conveniently usable with hydrocarbon solvents such as liquid propane, liquid ethane, liquid butane, liquid pentane, liquid hexane and the like. Also double salts of or complexes aluminum chloride and aluminum bromide are soluble in these hydrocarbons and are particularly useful.

The polymerization is conveniently conducted by spraying the liquid catalyst or catalyst solution through a nebulizer or spraying nozzle onto the surface of the rapidly stirred cold olefinic material. The reaction, especially with the more active catalysts, proceeds promptly to yield the desired polymer.

This polymer preferably has a molecular weight, as determined by the Staudinger method, or a Staudinger number, of from 30,000 to about 85,000, the preferred range being from 40,000 to about 60,000. The polymer likewise preferably has an iodine number ranging from about ½ to about 50, the preferred range being between about 1 and 20. The polymer is a white, more or less transparent or translucent material with considerable plasticity and cold flow.

The material is reactive in a curing reaction with sulfur, especially in the presence of a sulfurization aid such as "Tuads" (tetra methyl thiuram disulfide). It is also reactive for a cure with such substances as paraquinone dioxime, especially in the presence of an inorganic oxidizing agent such as $Pb_3O_4$. The polymer is similarly reactive with the dinitroso compounds, either meta or para. A convenient recipe for compounding the polymer is:

| | Parts |
|---|---|
| Polymer | 100 |
| Zinc oxide | 0.5 to 10 |
| Stearic acid | 0.5 to 7 |
| Carbon black | 10 to 200 |
| Sulfur | 2 to 4 |
| Tuads | 1 to 4 |

The "Tuads" and sulfur may be replaced by paraquinone dioxime or other dioxime substances in the proportion of approximately 2 to 4 parts, or by a dinitroso compound in the proportion of from 1 to 4 or 5 parts; or mixtures of the various substances may be used.

The compound is conveniently prepared on the roll mill, and the completed compound may be placed in molds and cured at temperatures ranging from 260° F. to 350° F. for time intervals ranging from a few minutes to 5 or 6 hours, depending upon the nature and amount of the curing component.

The resulting cured polymer will show a tensile strength within the range between 500 lbs. and 4500 lbs. per square inch, with an elongation at break ranging from 250% to 1200%, and a modulus of elasticity (pounds pull to produce an elongation of 300%) ranging from 50 to 500. The polymer also shows a high resistance to oxidation by air and ozone, shows a very high abrasion resistance, a very high flexure resistance and other very valuable physical properties which make it a superior replacement for natural rubber.

However, it is frequently desirable to refabricate the polymer, especially when it has been made into automobile tires or analogous substances and the structure worn out.

According to the present invention, the polymer may be reclaimed or "devulcanized" by a treatment at elevated temperatures in the presence of hydrogen sulfide. For this purpose the used polymer, compounded, cured and used through a normal life as above outlined, is shredded into relatively small portions, and placed in a closed container from which the air is displaced by a slow stream of hydrogen sulfide. The polymer in the container is then heated in the presence of the hydrogen sulfide to an elevated temperature ranging between 250° F. and 350° F., the heating being continued for from 1 to 4 or 5 hours, depending upon the tightness of cure of the original compound and the ease of remilling desired.

The metalloid hydrides above mentioned may be used in the same manner for similar results; and in some instances, the inorganic elements combine into the polymer to yield a polymer having modified characteristics which are for some purposes of considerable value.

The preferred procedure is the use of gaseous hydrogen sulfide at an elevated temperature under atmospheric pressure. However, in some instances, elevated pressures are desirable since this avoids the necessity of shredding the cured polymer into small fragments. In some instances also, liquid hydrogen sulfide may be used, provided the temperature is kept below the critical temperature; and in this instance also, the requirements for shredding are much eased. The time of treatment varies according to the temperature and the pressure as well as according to the character of the curing agent, the degree of cure, and the molecular weight of the original polymer. At high temperature, high pressure and very finely shredded polymer, the treatment may be completed in a relatively few minutes ranging from 15 to 30 minutes. At atmospheric pressure with relatively low temperature and coarse fragments of polymer, the treatment may require many hours or even days for completion.

EXAMPLE 1

A portion of polymer prepared from 97.5 parts of isobutylene with 2.5 parts of isoprene (both of 96% to 99% purity) which had been compounded according to the above recipe with sulfur and "Tuads" was shredded into small fragments and the fragments placed in a non-corrosive container. The container was closed and a slow stream of hydrogen sulfide passed through. The container was heated by a steam jacket to a temperature of 320° F. (75 lbs. pressure of steam) for 2 hours. At the end of the 2-hour time interval the polymer shreds were removed from the container, cooled somewhat and placed on the mill. They were found to be plastic and readily millable. The devulcanized polymer banded within 2 minutes, and was readily remilled with additional sulfur and "Tuads." The remilled polymer was then placed in molds and cured at 307° F. for 30 minutes to yield a polymer having an adequate tightness of cure. Test samples cut from the cured polymer showed good strength, good elongation and good physical properties in general; the tensile strength at break being about 1800 pounds per square inch, the elongation at break being about 1150%; the modulus being about 350.

These results show the quality of reclaimed, devulcanized material after recompounding and recuring.

EXAMPLE 2

A quantity of cured polymer was obtained which was known to have been compounded according to the following recipe and cured:

| Compound # | 1 |
|---|---|
| Polymer | 100.0 |
| Zinc Oxide | 5.0 |
| Stearic Acid | 2.0 |
| Semi-reinforcing Furnace Black | 50.0 |
| Process Oil | 5.0 |
| Sulfur | 2.0 |
| Tetramethylthiuram disulfide | 1.0 |
| Batch Wt | 165.0 |
| Cure Time @ 300° F minutes | 30 |
| Tensile-Mod. @ 300-Elong | 2390-540-700 |

The material compounded, as above indicated, was treated at 160° C. in a slow stream of hydrogen sulfide for three hours, this length of time of treating being sufficient to render the shredded reclaim completely soluble in 55° naphtha without any milling. The material after this treatment showed a Mooney viscosity (8 minutes at 100° C.) of 105.

Another sample of cured reclaim known to have been compounded according to the following recipe and cured was also similarly processed:

| Compound # | 2 |
|---|---|
| Polymer | 100.0 |
| Zinc Oxide | 5.0 |
| Stearic Acid | 2.0 |
| Semi-reinforcing Furnace Black | 50.0 |
| Process Oil | 5.0 |
| Sulfur | 2.0 |
| Mercaptobenzothiazole | 1.5 |
| Batch Wt | 165.5 |
| Cure Time @ 300° F minutes | 120 |
| Tensile-Mod. @ 300-Elong | 2300-465-800 |

This reclaim was treated at 160° C. in hydrogen sulfide for two hours which was found to be sufficient time to make the reclaim completely soluble in 55° naphtha without milling. This material at the end of this treating time showed a Mooney viscosity (8 minutes at 100° C.) of 63.

A third sample of reclaim known to have been compounded according to the following recipe and cured was also treated:

| Compound # | 3 |
|---|---|
| Polymer | 100.0 |
| Zinc Oxide | 5.0 |
| Stearic Acid | 2.0 |
| Semi-reinforcing Furnace Black | 50.0 |
| Process Oil | 5.0 |
| Sulfur | 2.0 |
| Tributylidene-aniline | 1.0 |
| Batch Wt | 165.0 |
| Cure Time @ 300-Elong minutes | 120 |
| Tensile-Mod. @ 300-Elong | 2400-480-740 |

This material also was treated for three hours at 160° C. in hydrogen sulfide to render it completely soluble in 55° naphtha. This material at the end of the treating time showed a Mooney viscosity (8 minutes at 100° C.) of 103.

These materials after reclaiming were compounded with various compounding agents and cured for varying lengths of time, after which determinations of tensile strength, modulus and elongation at break were made.

For purposes of reference, several samples of a good quality of new raw polymer were compounded, cured and evaluated according to the following subjoined table.

| Compound # | 1 | 2 | 3 |
|---|---|---|---|
| Polymer | 100.0 | 100.0 | 100.0 |
| Zinc Oxide | 5.0 | 5.0 | 5.0 |
| Stearic Acid | 2.0 | 2.0 | 2.0 |
| Semi-reinforcing Furnace Black [1] | 50.0 | 50.0 | 50.0 |
| Process Oil [2] | 5.0 | 5.0 | 5.0 |
| Sulfur | 2.0 | 2.0 | 2.0 |
| Tetramethylthiuram disulfide [3] | 1.0 | | |
| Mercaptobenzothiazole [4] | | 1.5 | |
| Tributylidene-aniline [5] | | | 1.0 |
| Tensile-Mod. @ 300-Elong.: | | | |
| Cured 10'/320° F | 2460-375-770 | Poor Cure | 700-0-1310 |
| Cured 20'/320° F | 2650-530-690 | 1580-205-990 | 1840-185-1030 |
| Cured 40'/320° F | 2530-685-620 | 2285-255-900 | 2395-270-840 |
| Cured 80'/320° F | 2470-720-600 | 2375-340-810 | 2605-360-750 |
| Cured 120'/320° F | 2375-680-630 | 2275-445-700 | 2535-475-720 |

[1] Gastex.
[2] Forum 40.
[3] Tuads.
[4] Captax.
[5] 808.

The three samples of reclaim previously treated were then separately compounded with varying amounts of different types of curing aids, cured for varying lengths of time and tested to yield the inspection records shown in Tables 1, 2 and 3.

These results show the excellent quality of reclaim prepared according to this process.

EXAMPLE 3

It is not necessary that the reclaim be used alone, but still better results are obtainable by mixing with the reclaim, from 10% to 75% of fresh, raw polymer. By the use of such mixtures in standard compounding formulae, tensile strengths, elongations at break and moduli, closely the same as those of the fresh raw polymer compounded and cured alone in the same formula, are obtainable and for automobile tires and tubes this procedure is preferred.

TABLE I
Evaluation of reclaim 8834–1

| Compound # | 1 | 2 | 3 | 4 | 5 | 6 | 7 | 8 |
|---|---|---|---|---|---|---|---|---|
| Reclaimed polymer compound | [1] 165.0 | [1] 165.0 | [1] 165.0 | [1] 165.0 | [1] 165.0 | | | |
| Zinc Oxide | 5.0 | 5.0 | 5.0 | 5.0 | 5.0 | | | |
| Sulfur | | | 2.0 | 2.0 | 2.0 | | | |
| Tetramethylthiuram disulfide [2] | | 1.0 | 1.0 | | | | | |
| Mercaptobenzo thiazole [3] | | | | | 1.5 | | | |
| Tributylidene-aniline [4] | | | | 1.0 | | | | |
| Control: | | | | | | | | |
| Compound 1 | | | | | | 75.0 | 50.0 | 25.0 |
| Compound 3 | | | | | | 25.0 | 50.0 | 75.0 |
| Tensile–Mod.@300–Elong.: | | | | | | | | |
| Cured 10'/320° F | 995-150-930 | 2265-335-860 | 2495-435-800 | 1610-200-910 | 1510-185-960 | 2450-365-750 | 2520-420-740 | 2350-415-750 |
| Cured 20'/320° F | 1445-200-1030 | 2350-475-740 | 2460-590-710 | 2160-320-870 | 2110-295-840 | 2595-575-690 | 2625-575-710 | 2585-635-690 |
| Cured 40'/320° F | 1970-265-870 | 2420-560-720 | 2275-755-620 | 2400-435-790 | 2190-385-760 | 2530-675-630 | 2615-730-660 | 2570-710-650 |
| Cured 80'/320° F | 2175-325-880 | 2280-745-670 | 1990-815-590 | 2545-520-750 | 2320-515-730 | 2555-740-610 | 2540-750-630 | 2450-775-610 |
| Cured 120'/320° F | 2225-410-800 | 2220-615-660 | 2400-730-640 | 2445-525-690 | 2345-575-710 | 2485-710-620 | 2585-830-630 | 2230-780-600 |

[1] 100 parts of polymer, 65 parts of compounding ingredients.
[2] Tuads.
[3] Captax.
[4] 808.

TABLE II
Evaluation of reclaim 8834–2

| Compound # | 1 | 2 | 3 | 4 | 5 | 6 | 7 | 8 |
|---|---|---|---|---|---|---|---|---|
| Reclaimed polymer compound | [1] 165.5 | [1] 165.5 | [1] 165.5 | [1] 165.5 | [1] 165.0 | | | |
| Zinc Oxide | 5.0 | 5.0 | 5.0 | 5.0 | 5.0 | | | |
| Sulfur | | | 2.0 | 2.0 | 2.0 | | | |
| Tetramethylthiuram disulfide [2] | | 1.0 | 1.0 | | | | | |
| Mercaptobenzothiazole [3] | | | | | 1.5 | | | |
| Tributylidene-aniline [4] | | | | 1.0 | | | | |
| Control: | | | | | | | | |
| Compound 1 | | | | | | 75.0 | 50.0 | 25.0 |
| Compound 3 | | | | | | 25.0 | 50.0 | 75.0 |
| Tensile–Mod.@300–Elong.: | | | | | | | | |
| Cured 10'/320° F | 1340-165-990 | 2110-375-770 | 2280-480-730 | 575-150-930 | 1510-250-830 | 2270-410-800 | 2340-425-770 | 2370-480-740 |
| Cured 20'/320° F | 1750-220-730 | 2250-520-710 | 2210-590-700 | 1890-245-930 | 1770-315-830 | 2580-520-750 | 2430-575-710 | 2340-620-670 |
| Cured 40'/320° F | 2050-330-820 | 2200-625-650 | 2530-700-690 | 2160-390-810 | 2440-650-660 | 1890-680-700 | 2230-635-660 | 2420-745-640 |
| Cured 80'/320° F | 2260-430-790 | 2290-630-660 | 2300-680-660 | 2130-435-790 | 2040-540-800 | 2330-690-620 | 2320-690-670 | 2430-690-690 |
| Cured 120'/320° F | 2100-500-730 | 2180-610-680 | 2280-700-670 | 2290-515-750 | 1980-560-690 | 2100-630-680 | 2280-630-690 | 2370-675-710 |

[1] 100 parts of polymer, 65.5 parts of compounding ingredients.
[2] Tuads.
[3] Captax.
[4] 808.

TABLE III
Evaluation of reclaim 8834–3

| Compound # | 1 | 2 | 3 | 4 | 5 | 6 | 7 | 8 |
|---|---|---|---|---|---|---|---|---|
| Reclaimed polymer compound | [1] 165.0 | [1] 165.0 | [1] 165.0 | [1] 165.0 | [1] 165.0 | | | |
| Zinc Oxide | 5.0 | 5.0 | 5.0 | 5.0 | 5.0 | | | |
| Sulfur | | | 2.0 | 2.0 | 2.0 | | | |
| Tetramethylthiuram disulfide [2] | | 1.0 | 1.0 | | | | | |
| Mercaptobenzothiazole [3] | | | | | 1.5 | | | |
| Tributylidene-aniline [4] | | | | 1.0 | | | | |
| Control: | | | | | | | | |
| Compound 1 | | | | | | 75.0 | 50.0 | 25.0 |
| Compound 3 | | | | | | 25.0 | 50.0 | 75.0 |
| Tensile–Mod.+300–Elong.: | | | | | | | | |
| Cured 10'/320° F | 1020-160-920 | 1770-340-700 | 2200-640-650 | 1610-200-930 | 1180-155-890 | 2370-315-830 | 2520-405-780 | 2370-355-800 |
| Cured 20'/320° F | 1760-200-920 | 2330-465-720 | 2470-630-670 | 2090-300-840 | 1860-240-890 | 2470-425-730 | 2690-540-730 | 2610-520-740 |
| Cured 40'/320° F | 2160-275-850 | 2650-520-750 | 2580-735-670 | 2380-410-800 | 2050-345-780 | 2370-510-680 | 2560-630-650 | 2550-585-710 |
| Cured 80'/320° F | 2410-380-820 | 2480-565-710 | 2460-765-640 | 2380-500-730 | 2130-470-750 | 2590-680-650 | 2630-720-650 | 2480-700-670 |
| Cured 120'/320° F | 2590-470-780 | 2450-580-710 | 2440-845-610 | 2510-620-740 | 2160-505-720 | 2350-640-630 | 2730-735-660 | No data |

[1] 100 parts of polymer, 65 parts of compounding ingredients.
[2] Tuads.
[3] Captax.
[4] 808.

EXAMPLE 4

In the above examples, the polymer was, in each instance, devulcanized to complete solubility in 55° naphtha by the hydrogen sulfide treatment. This, however, is not necessary, since extremely interesting results are obtainable by a partial devulcanization only. By this procedure, a somewhat higher tensile strength material is obtained, and a material which, while it does not band on the mill as quickly and easily as the fully devulcanized material, yields a compound having a definitely higher modulus than is obtained from the fully devulcanized material. Also the partially devulcanized material may be milled for a substantial length of time and then milled into a further portion of fresh raw polymer to effect a substantial improvement in the extruding and processing properties of the compound, since the material shows a higher bruise resistance, less swell from the extruder and easier handling throughout the subsequent processing; and also a higher modulus, which, for many purposes, is advantageous.

Thus the process of the invention devulcanizes, or reclaims a cured polymer to yield a material suitable for remilling, recompounding and recuring to yield a new polymer structural element.

While there are above disclosed but a limited number of embodiments of the process of the invention, it is possible to produce still other embodiments without departing from the inventive concept herein disclosed and it is therefore desired that only such limitations be imposed upon the appended claims as are stated therein.

The invention claimed is:

1. In the process for reclaiming an elastic polymer prepared by the steps of cooling a mixture of isobutylene and a member of the class consisting of cyclopentadiene and a multiolefin having from 4 to 10 carbon atoms per molecule to a temperature within the range between —40° C. and —164° C., polymerizing the cooled mixture by the application thereto of a Friedel-Crafts catalyst in solution in an inert organic, non-complex forming solvent which is liquid at the polymerization temperature and curing the resulting polymer by reaction with sulfur, the improvement comprising heating the cured elastic polymer to a temperature within the range of 250° F. to 350° F. in the presence of added hydrogen sulfide until said polymer becomes plastic and millable.

2. In the process for reclaiming an elastic polymer prepared by the steps of cooling a mixture of 70 to 99.5 parts by weight of isobutylene and 30 to 0.5 parts by weight of a diolefin having from 4 to 6 carbon atoms per molecule to a temperature within the range between —40° C. and —164° C., polymerizing the cooled mixture by the application thereto of an aluminum halide catalyst in solution in an inert organic, non-complex forming solvent which is liquid at the polymerization temperature, and curing the resulting polymer by reaction with sulfur; the improvement comprising the step of heating the cured polymer in a closed zone to a temperature within the range of 250° F. to 350° F. for 1 to 5 hours in the presence of hydrogen sulfide added to said zone, whereby the elastic polymer becomes devulcanized and plastic.

3. In the process for reclaiming a polymer prepared by the steps of cooling a mixture of a major proportion of isobutylene and a minor proportion of isoprene to a temperature within the range between —40° F. and —262.4° F., polymerizing the cooled mixture by the application thereto of an aluminum chloride catalyst in solution in an inert organic, non-complex forming solvent which is liquid at the polymerization temperature, and curing the resulting polymer by reaction with sulfur in the presence of 5 to 10 parts of zinc oxide per 100 parts of polymer; the improvement comprising the steps in combination of shredding the cured polymer and heating it to a temperature within the range of 250° F. to 350° F. for 1 to 5 hours in a stream of hydrogen sulfide, and milling the polymer to plasticity.

4. In the process for reclaiming a polymer prepared by the steps of cooling a mixture of isobutylene and a diolefin having from 4 to 6 carbon atoms per molecule to a temperature within the range between —40° F. and —262.4° F., polymerizing the cooled mixture by the application thereto of an aluminum halide catalyst in solution in an inert organic, non-complex forming solvent which is liquid at the polymerization temperature, and curing the resulting polymer by reaction with sulfur; the improvement comprising the steps in combination of heating the cured polymer to a temperature within the range of 250° F. to 350° F. in the presence of added hydrogen sulfide for 1 to 5 hours, compounding the resulting plastic polymer with further portions of sulfur and thereafter heating the recompounded polymer to curing temperature to obtain a vulcanized elastic product.

5. A process according to claim 1 wherein the polymer is prepared by polymerizing a mixture of isobutylene and cyclopentadiene.

6. A process according to claim 2 wherein the diolefin is butadiene.

7. A process according to claim 2 wherein the catalyst is aluminum chloride in solution in an alkyl chloride having less than 3 carbon atoms per molecule.

8. A process according to claim 3 wherein the aluminum chloride catalyst is in solution in methyl chloride.

FRANCIS P. BALDWIN.

REFERENCES CITED

The following references are of record in the file of this patent:

UNITED STATES PATENTS

| Number | Name | Date |
|---|---|---|
| 2,137,584 | Ott | Nov. 22, 1938 |
| 2,305,412 | Frolich | Dec. 15, 1942 |
| 2,356,128 | Thomas | Aug. 22, 1944 |

OTHER REFERENCES

Baldwin (1), Ind. and Eng. Chem., Sept. 1944, pp. 791–795.

Baldwin (2), Division of Rubber Chemistry Abstracts of Papers presented at the Spring 1944 meeting, April 1944, pp. 11Q–12Q.